United States Patent [19]
Hernández et al.

[11] Patent Number: 5,883,054
[45] Date of Patent: Mar. 16, 1999

[54] THERMALLY STABLE DRILLING FLUID

[75] Inventors: María Isabel Hernández; Manuel Mas; Reinaldo Jacques Gabay; Lirio Quintero, all of Caracas, Venezuela

[73] Assignee: Intevep, S.A., Caracas 1070A, Venezuela

[21] Appl. No.: 933,632

[22] Filed: Sep. 19, 1997

[51] Int. Cl.$^6$ ...................................................... C09K 7/00
[52] U.S. Cl. ........................... 507/117; 507/140; 507/135
[58] Field of Search .................................... 507/135, 140, 507/117

[56] References Cited

U.S. PATENT DOCUMENTS

| | | | |
|---|---|---|---|
| 5,333,698 | 8/1994 | Van Slyke | 175/65 |
| 5,447,197 | 9/1995 | Rae et al. | 166/293 |
| 5,634,984 | 6/1997 | Van Slyke | 134/40 |
| 5,636,457 | 6/1997 | Van Slyke | 507/103 |
| 5,723,423 | 3/1998 | Van Slyke | 510/188 |

FOREIGN PATENT DOCUMENTS

WO9309201  5/1993  WIPO .

*Primary Examiner*—C. H. Kelly
*Attorney, Agent, or Firm*—Bachman & LaPointe, P.C.

[57] ABSTRACT

A thermally stable drilling fluid system includes drilling fluid and an additive wherein the additive includes styrene-butadiene copolymers having an average molecular weight greater than about 500,000 g/mol, wherein the drilling fluid system exhibits fluid loss control at high temperature and high pressure conditions.

20 Claims, No Drawings

THERMALLY STABLE DRILLING FLUID

BACKGROUND OF THE INVENTION

The invention relates to drilling fluids and, more particularly, to a thermally stable drilling fluid including an additive which provides thermal stability and enhanced fluid loss control.

Drilling fluids are commonly used in the process of drilling bore holes in subterranean formations. Oil-based drilling fluids are known and used for recovering oil as well as gas. However, a general problem that remains in the industry is that commercially available drilling fluids demonstrate unsatisfactory thermal stability and, after exposure to temperatures higher than about 300° F., tend to exhibit a decrease in rheological properties such as gel strength and yield point, as well as a decrease in fluid loss control.

Furthermore, known drilling fluids typically include many ingredients, most of them of solid nature, which make the drilling fluid expensive. Since large volumes of fluid are used in the course of drilling, the various ingredients have a large economic impact on the overall drilling procedure. This kind of additive in conventional drilling fluids is further undesirable since solids can cause damage to the formation during drilling.

It is therefore clear that the need remains for a thermally stable fluid system which can be used at temperatures higher than 350° F. which will maintain rheological properties and fluid loss control at such high temperatures, and which is economically desirable while minimizing formation damage.

It is therefore the primary object of the present invention to provide a thermally stable drilling fluid having an additive for enhancing thermal stability and maintaining fluid loss control at high temperature.

It is a further object of the present invention to provide a thermally stable drilling fluid system wherein fewer ingredients than conventionally necessary are used to provide a suitable fluid.

It is a still further object of the present invention to provide a thermally stable drilling fluid system wherein solid content and subsequent potentiality for formation damage are reduced.

Further objects and advantages of the present invention will appear hereinbelow.

SUMMARY OF THE INVENTION

In accordance with the invention, the foregoing objects and advantages are readily attained.

According to the invention, a thermally stable drilling fluid system is provided which comprises: drilling fluid and an additive comprising a styrene-butadiene copolymer having a molecular weight greater than about 500,000 g/mol, wherein said drilling fluid system exhibits fluid loss control at high temperature and high pressure conditions.

In accordance with one embodiment of the invention, the drilling fluid preferably comprises oil and an organophilic clay to which is added the styrene-butadiene copolymer additive.

In accordance with a further alternative embodiment, the drilling fluid comprises an emulsion, preferably an emulsion of water-in-oil, stabilized with a surfactant and the styrene-butadiene copolymer additive.

DETAILED DESCRIPTION

The invention relates to a thermally stable drilling fluid system having a styrene-butadiene copolymer additive which serves to provide enhanced thermal stability of the drilling fluid and excellent fluid loss control under both high temperature and high pressure conditions.

In accordance with the invention, drilling fluid systems have been found to be provided with excellent thermal stability and fluid loss control at temperatures exceeding 350° F. by providing an additive to the drilling fluid system which comprises styrene-butadiene copolymers having an average molecular weight greater than about 500,000 g/mol.

In accordance with the invention, the styrene-butadiene copolymer additive can be usefully incorporated into oil based drilling fluids such as all-oil drilling fluid, or water-in-oil emulsion drilling fluid.

In accordance with the invention, styrene-butadiene copolymer may suitably be added to the drilling fluid in an amount between about 1 pound per barrel (ppb) to about 6 ppb as measured by barrel of drilling fluid. The styrene-butadiene copolymer preferably has a styrene content of about 23% wt. Suitable styrene-butadiene copolymers preferably have an average molecular weight greater than about 500,000 g/mol is stated above. Suitable examples include hot synthesized copolymer such as a copolymer known as SBR 1012, and a cold synthesized copolymer such as the copolymer known as SBR 8113. Mixtures or blends of different copolymers could also be provided, such as blends of SBR 1012 as discussed above and another copolymer known as SBR 1502, which has an average molecular weight of about 500,000 g/mol. As will be demonstrated below, best results are obtained when the average molecular weight of the copolymer or copolymer mixture exceeds 500,000 g/mol in accordance with the present invention.

In accordance with the invention, an all oil drilling fluid system is provided which includes oil, an organophilic clay, the styrene-butadiene copolymer, and optionally a surfactant that behaves as an emulsifier and a wetting agent at the same time. Furthermore, a weighting agent may be provided in the drilling fluid system of the present invention so as to adjust the density of fluid to a desired level such as, for example, about 14 pounds per gallon (ppg), depending upon reservoir characteristics and other factors.

According to the invention, gasoil is particularly suitable for use in an all oil drilling fluid. Suitable oils include but are not limited to mineral oils with low aromatic content, synthetic oils and vegetable oils and their derivatives.

The organophilic clay for use in an all-oil drilling fluid is preferably a clay selected from the group consisting of hectorite, bentonite and mixtures thereof, more preferably bentonite. Organophilic clay is preferably provided in an all-oil drilling fluid system according to the invention in an amount between about 1 ppb to about 8 ppb.

Suitable emulsifiers and wetting agents include surfactants, ionic surfactants such as fatty acids, amines, amides and organic sulphonates, and mixtures of any of these with non-ionic surfactants such as ethoxylated surfactants.

The weighting agent, if desired, may be added so as to adjust density of the drilling fluid system. Suitable weighting agents include calcium carbonate, barite, hematite and mixtures thereof, as well as other substances well known for use in adjusting density of drilling fluid.

Water-in-oil emulsion in accordance with present invention may preferably include an oil phase, a water phase, a surfactant and the styrene-butadiene copolymer additive of the present invention.

As with all-oil drilling fluid, suitable oil may be gasoil or any other oil suitable for use as the base for a drilling fluid such as mineral oils with low aromatic content, synthetic oils and vegetable oils and their derivatives.

Water may be provided as fresh or salt water provided from any source, and the oil and water phases are preferably provided in an invert emulsion of water in oil wherein the ratio by volume of water to oil is between about 40:60 to about 5:95.

Suitable surfactants for use in preparing a water-in-oil emulsion drilling fluid include anionic surfactants, sulfonate surfactants, preferably alkyl aryl sulfonates, most preferably calcium phenylsulfonate. The surfactant may be provided in an invert emulsion drilling fluid system preferably in an amount between about 5 ppb to about 10 ppb.

Weighting agents such as calcium carbonate, barite, hematite and mixtures thereof may suitably be added to the invert emulsion drilling fluid system of the present invention so as to adjust density of same as desired. Salts or electrolytes such as calcium chloride may also be included for maintaining the water osmotic pressure in the emulsion and avoiding migration of the water into the formation. Other suitable salts include potassium chloride, sodium chloride, potassium acetate and the like.

For the water-in-oil emulsion drilling fluids of the present invention, additional additives may be provided such as viscosifiers and the like and other conventional additives as may be necessary or desired.

In accordance with the present invention, the addition of styrene-butadiene copolymer as discussed above has been found to enhance fluid loss control, particularly at increased temperatures, and also enhances the rheological properties of the drilling fluid. Furthermore, drilling fluids are formulated using the additive of the present invention which require fewer ingredients or additives than conventional drilling fluids, and which include less solid ingredients, thereby reducing cost as well as the possibility of formation damage due to use of high solid-content fluid.

The following examples further illustrate the advantageous features of all-oil and water-in-oil emulsion drilling fluids according to the invention using styrene-butadiene copolymer additives having an average molecular weight of greater than 500,000 g/mol.

EXAMPLE 1

This example demonstrates the properties of an all-oil drilling fluid according to the invention using a styrene-butadiene copolymer having an average molecular weight greater than 500,000 g/mol and is compared to drilling fluid prepared using other copolymers as additives as listed in Table 1. Four (4) drilling fluids were prepared using the additives in the proportions shown in Table 2 and were added in the order set forth therein. Barite was added in amounts sufficient to provide a density of about 14 ppg. Drilling fluid number 1 is an exemplary drilling fluid of the present invention. The polymers were dissolved in the oil for 16 hours before all the additives were added. After the addition of each additive, the resulting composition was mixed for the indicated mixing time before adding the next additive.

TABLE 1

| Polymer | | Average Molecular weight (g/mol) |
|---|---|---|
| (1) | Styrene-butadiene, random (Type SBR 1012) | >500,000 |
| (2) | Styrene-butadiene block copolymer (30% styrene by weight) | 120,000 |
| (3) | Styrene-butadiene, random (Type SBR 1502) | 500,000 |
| (4) | Styrene-butadiene thermoplastic rubber | — |

TABLE 2

| Additives | Concentration | Mixing time (minutes) |
|---|---|---|
| Gasoil (barrels) | 0.71 | — |
| Copolymer (ppb) | 3.00 | — |
| Fluid Loss Control Agent (Versatrol) (ppb) | 15 | 30 |
| VG-69 (bentonite, organophilic clay) (ppb) | 6.00 | 15 |
| Rheological Modifier (Versa HRP) (ppb) | 3.00 | 10 |
| Oil wetting agent (Versacoat) (ppb) | 0.5 | 10 |
| Lime (Ca(OH)$_2$) (ppb) | 1 | 10 |
| CaCO$_3$ (Lo-wate) (ppb) | 25 | 25 |
| Barite (ppb) | 330.8 | 30 |

These drilling fluids were aged for 16 hours at 350° F. in a cylindrical aging cell placed in a roller oven. Rheological properties, namely plastic viscosity, yield point and gel strength, were measured in a Fann 35A viscosimeter at 150° F. and atmospheric pressure after aging, in accordance with API procedure. The HTHP fluid loss control was measured at 500 psi and 350° F. after aging the fluid at the same temperature, also in accordance with API procedure. The results are set forth below in Table 3, wherein the drilling fluid numbers correspond to drilling fluids prepared using the polymer additives of Table 1.

TABLE 3

| Drilling fluid | Plastic viscosity (cP) | Yield point (*) | L6 (*) | L3 (*) | Gel strength (10"/10') (*) | HTHP fluid loss (ml/30 min) |
|---|---|---|---|---|---|---|
| 1 | 61 | 12 | 6 | 5 | 11/50 | 8.4 |
| 2 | 36 | 5 | 4 | 3 | 9/38 | 98.2 |
| 3 | 58 | 15 | 7 | 6 | 12/47 | 64 |
| 4 | 41 | 10 | 7 | 6 | 12/44 | 85.6 |

(*): lbs/100 sq. ft.
HTHP: high temperature-high pressure.
(10"/10'): gel strength at 10 seconds and 10 minutes.

It can be seen from Table 3 that the all-oil drilling fluid of the present invention, fluid number 1, exhibits the best results, since it maintains rheological properties and effective fluid loss control at HTHP conditions.

As is known for those skilled in the art, it is considered that an all-oil drilling fluid has good rheological properties when the yield point is greater than 2 lbs/100 ft$^2$., the gel strength is equal to or greater than 2 lbs/100 ft$^2$., and the fluid loss control is less than 10 ml/30 min. As can be seen in Table 3, drilling fluid (1) according to the present invention is the only fluid of those tested which met all desired criteria including HTHP fluid loss.

EXAMPLE 2

Five drilling fluids were prepared as shown in Table 4 below, varying the polymer concentration. The initial rheological properties were measured. Except where indicated to the contrary, the samples were aged at 350° F. for 16 hours and rheological properties were measured at atmospheric pressure and at a temperature of 150° F.±2° F. in a Fann 35 viscosimeter.

TABLE 4

| Ingredient | | Mixing time (min) |
|---|---|---|
| Gasoil (barrels) | 0.75 | — |
| Polymer (ppb) | (4.5;4;3) | predissolved in gasoil |
| Emulsifiers and wetting agents (ppb) | 6 | 10 |
| Lime (Ca(OH)$_2$)(ppb) | 4 | 15 |
| Organophilic clay (ppb) | 6 | 30 |
| Barite | enough to reach desired density | 30 |

The results are shown in Table 5.

TABLE 5

| Drilling fluid | Polymer concen. (ppb) | Plastic viscosity (cP) (I/AA) | Yield point (*) | Gel strength (10') (*) | Gel strength (10") (*) | HTHP fluid loss (ml/30 min) |
|---|---|---|---|---|---|---|
| 1 | 4.5 | 60/73 | 13/28 | 3/7 | 5/10 | 5.0 |
| 2** | 4.5 | 73/37 | 13/18 | 3/2 | 5/2 | — |
| 3 | 3 | 38/40 | 7/6 | 3/4 | 7/12 | 5.6 |
| 4 | 4 | 48/56 | 11/9 | 4/5 | 7/13 | 5.6 |
| 5*** | 4 | 47/42 | 11/6 | 4/4 | 7/21 | 10 |

I/AA: initial/after aging
(*) :lbs/100 ft$^2$.
**Properties measured in Fann 70 viscosimeter at 350° F. and 10,800 psi
***Hot rolling at 400° F. for 16 hours.

This example demonstrates that the rheological properties and fluid loss control of the all-oil drilling fluid of the present invention remain stable at lower polymer concentrations and when subjected to temperature of 400° F.

EXAMPLE 3

Four formulations of commercially available drilling fluids were prepared according to the procedure set forth for each one in corresponding tables below. For comparison, drilling fluids within the scope of the invention were also prepared. The properties of each sample were measured before and after aging. The rheological properties were measured at 150° F., viscometer Fann 35A, at atmospheric pressure in accordance with API procedure. The HTHP fluid loss control was measured at 500 psi and 350° F.

Commercial fluids, Versacore M-I drilling fluid, densities 14 and 15 ppg, were prepared following the procedure shown in Tables 6 and 7, and the procedure for preparation of a fluid according to the invention is also shown in Table 7.

TABLE 6

| Ingredient | Versacore Reformulated | Versacore 350° F. | Mixing time (min) |
|---|---|---|---|
| Gasoil (barrels) | 0.70 | 0.61 | — |
| Polymer (ppb) | 0 | 0 | predissolved in gasoil |
| Versatrol-HT (ppb) | 15 | 25 | 30 |
| Lo-Wate Tech (ppb) | 25 | 30 | 25 |
| VG-69 brand bentonite-based organophilic clay (ppb) | 6 | 10 | 15 |
| Versa-HRP rheological modifier (ppb) | 3 | 5 | 10 |
| Versacoat brand oil wetting agent (ppb) | 0.5 | 3 | 10 |
| Lime(Ca(OH)$_2$) (ppb) | 1 | 2 | 10 |
| Barite (ppb) | () | () | 30 |

(**) enough to obtain the desired density
ppb: pounds per barrel.

TABLE 7

| Ingredient | Versacore | Invention | Mixing time (min) | |
|---|---|---|---|---|
| | | | Versacore | Invention |
| Gasoil (barrels) | 0.61 | 0.75 | predissolved in gasoil | |
| Polymer (ppb) | 0 | 4.5 | | |
| Versatrol-HT (ppb) | 15 | 0 | 20 | — |
| Lo-Wate Tech (ppb) | 25 | 0 | 30 | — |
| VG-69 brand bentonite-based organophilic clay (ppb) | 6 | 6 | 15 | 15 |
| Versa-HRP (ppb) | 3 | 0 | 15 | — |
| Versacoat brand oil wetting agent (ppb) | 0.5 | 0.5 | 10 | 10 |
| Lime(Ca(OH)$_2$) (ppb) | 1 | 1 | 15 | 10 |
| Barite (ppb) | () | () | 30 | 30 |

(**) enough to obtain the desired density
ppb: pounds per barrel

The test results can be observed in Table 8.

TABLE 8

| | Versacore (initial-aged) | Versacore Reformulated (initial-aged) | Versacore 350° F. (initial-aged) | Invention (initial-aged) |
|---|---|---|---|---|
| Plastic viscosity (cP) | 31–28 | 22–22 | 73–56 | 60–73 |
| Yield point (*) | 37–3 | 23–4 | 87–12 | 13–28 |
| L6(*) | 25–1 | 23–4 | 60–8 | 4–8 |
| L3(*) | 24–0 | 20–3 | 58–7 | 3–6 |
| Gel strength (10"/10') | 33/37–2/27 | 25/36–3/31 | 78/92–14/54 | 3/5–7/10 |
| HTHP fluid loss (ml/30 min) | —/(**) | —/90 | —/2.2 | —/4.7 |

(*) lbs/100 sq. ft.
HTHP: high temperature-high pressure.
(10"/10'): gel strength at 10 seconds and at 10 minutes.
(**) without control As shown, the drilling fluid of the present invention compares favorably to all other fluids tested.

For a Baker-Hughes/Inteq (BHI) reformulated drilling fluid, (Carbocore System) the preparation procedure is shown in Table 9. The fluid has a density of 14 ppg.

TABLE 9

| Ingredient | Concentration | Mixing time (min) |
|---|---|---|
| Gasoil (bbl) | 0.75 | — |
| Carbotec (ppb) | 4 | 10 |
| Lime (ppb) | 4 | 10 |
| Carbovis (ppb) | 8 | 15 |
| Carbotrol-HT(ppb) | 14 | 10 |
| Barite (ppb) | (**) | 30 |

(bbl): barrels
(ppb): pounds per barrel
(ppg): pounds per gallon
(**) enough to obtain the desired density of 14 ppg Two drilling fluids according to the present invention were also prepared having different concentrations, as shown in Table 10.

TABLE 10

| Ingredient | Invention (1) | Invention (2) | Mixing time (min) |
|---|---|---|---|
| Gasoil (bbl) | 0.75 | 0.75 | — |
| Polymer (bbl) | 3.0 | 4.0 | predissolved in the gasoil |
| Carbotrol-HT(ppb) | 0 | 0 | — |
| Carbotec (ppb) | 6.0 | 6.0 | 10 |
| Lime (ppb) | 4.0 | 4.0 | 15 |
| Carbovis (ppb) | 6.0 | 6.0 | 30 |
| Barite (ppb) | () | () | 30 |

(**) enough to obtain the desired density of 14 ppg

The comparative test results can be seen in Table 11.

TABLE 11

|  | BHI | | Inven.(1) | | Inven.(2) | |
|---|---|---|---|---|---|---|
|  | (initial) | (aged) | (initial) | (aged) | (initial) | (aged) |
| Plastic viscosity (cP) | 27 | 29 | 41 | 41 | 48 | 56 |
| Yield Paint(*) | 11 | 1 | 7 | 10 | 11 | 9 |
| L6(*) | 7 | 3 | 4 | 5 | 4 | 4 |
| L3(*) | 6 | 2 | 3 | 4 | 3 | 3 |
| Gel strength (10"/10')(*) | 7/22 | 3/15 | 4/8 | 5/14 | 4/7 | 5/13 |
| HTHP fluid loss (ml/30 min) |  | 2.2 |  | 4.4 |  | 4.0 |

(*): lbs/100 ft$^2$.
HTHP: high temperature-high pressure.
(10"/10'): gel strength at 10 seconds and at 10 minutes.

This example shows that the drilling fluid of the present invention has good rheological properties, shows a better yield point and maintains fluid loss control at high temperature, while using less additives than are used for the commercially available drilling fluid.

EXAMPLE 4

A drilling fluid was prepared as in Example 3, Table 10, Invention (1), and was aged at 350° F. and 400° F. The test results are set forth in Table 12.

TABLE 12

|  | Inven.(1) (initial) | Inven.(1) (aged at 350° F.) | Inven.(1) (aged at 400° F.) |
|---|---|---|---|
| Plastic viscosity (cP) | 55 | 72 | 42 |
| Yield point(*) | 12 | 22 | 6 |
| L6(*) | 4 | 10 | 3 |
| L3(*) | 3 | 9 | 2 |
| Gel strength (10"/10')(*) | 4/10 | 14/28 | 4/21 |
| HTHP fluid loss (ml/30 min) |  | 3.0 at 350° F. | 9.6 at 400° F. |

This example demonstrates that the rheological properties and the fluid loss control of the drilling fluid of the present invention are maintained after aging at temperatures up to 400° F., despite containing less additives than other formulations, while commercial fluids such as Versacore (M-I Drilling Fluids) and Carbocore (Baker-Hughes/Inteq) lose their properties at 350° F. as shown in Example 3.

EXAMPLE 5

This example demonstrates the advantages of the water-in-oil emulsion drilling fluid of the present invention. Three commercially available water-in-oil emulsion drilling fluids were prepared according to the procedures supplied by respective service companies. The ingredients were added and mixed as shown in Tables 13, 14 and 15.

TABLE 13

| Ingredient | M-I drilling fluid water-in-oil emulsion | Mixing time (min) |
|---|---|---|
| Gasoil (barrels) | 0.62 | — |
| Versamul (emulsifier) (ppb) | 5 | 10 |
| Lime (ppb) | 8 | 30 (a) |
| VG-69 (bentonite based organophilic clay) (ppb) | 2 | 10 |
| Versatrol (filtration control agent) (ppb) | 4 | 10 |
| Versacoat (wetting agent) (ppb) | 4 | 10 |
| Barite (ppb) | (**) | 10 |

(**) enough to obtain a density of 15 pounds per gallon
(a) 230,000 ppm of brine is mixed simultaneously with the lime.

TABLE 14

| Ingredient | BHI water-in-oil emulsion | Mixing time (min) |
|---|---|---|
| Gasoil (barrels) | 0.62 | — |
| Carbo-Tec (emulsifier) (ppb) | 5 | 10 |
| Lime (ppb) | 6 | 30 (a) |
| Carbo-Gel (organophilic clay) (ppb) | 2 | 10 |
| Carbo-Trol (filtration control agent) (ppb) | 5 | 10 |
| Carbo-Mul emulsifier (ppb) | 5 | 10 |
| Barite (ppb) | (**) | 10 |

(**) enough to obtain a density of 15 pounds per gallon.
(a) 230,000 ppm of brine is mixed simultaneously with the lime.

TABLE 15

| Ingredient | Bariod water-in-oil emulsion | Mixing time (min) |
|---|---|---|
| Gasoil (barrels) | 0.62 | — |
| Invermul (emulsifier) (ppb) | 5 | 10 |
| Line (ppb) | 8 | 30(a) |
| Geltone II (organophilic clay) (ppb) | 2 | 10 |
| Duratone (fluid loss control agent) (ppb) | 4 | 10 |
| EZ-MUL (emulsifier) (ppb) | 4 | 10 |
| Barite (ppb) | (**) | 10 |

(**) enough to obtain a density of 15 pounds per gallon
(a) 230,000 ppm of brine is mixed simultaneously with the lime.

Table 16 shows the results for the commercially available drilling fluids.

TABLE 16

| | M-I drilling fluids water-in-oil emulsion (initial/aged) | BH water-in-oil emulsion (initial/aged) | Baroid water-in-oil emulsion (initial/aged) |
|---|---|---|---|
| Plastic viscosity (cP) | 31/45 | 25/27 | 25/28 |
| Yield point (*) | 10/0 | 9/8 | 7/0 |
| Gel strength | | | |
| 10" (*) | 14/5 | 4/3 | 6/3 |
| 10' (*) | 22/4 | 5/4 | 7/5 |
| Density (ppb) | 15/15 | 15/15 | 15/15 |
| HTHP fluid loss (ml/30 min) | 44/12 | 6/6 | 53/70 |

(*): lbs/100 ft².
HTHP: high temperature-high pressure.
(10"/10'): gel strength at 10 seconds and at 10 minutes.

Seven drilling fluids according to the invention were prepared having different concentrations of polymer, surfactant and water/oil ratio, as shown in Table 17. These drilling fluids were aged at different temperatures and the results are shown in Tables 18 and 19.

TABLE 17

| Drilling fluid Number (DF) | Polymer concentration (ppb) | Surfactant concentration (ppb) | Oil-water |
|---|---|---|---|
| DF1 | 2 | 10 | 85/15 |
| DF2 | 3 | 10 | 85/15 |
| DF3 | 2 | 15 | 85/15 |
| DF4 | 3 | 15 | 85/15 |
| DF5 | 3 | 10 | 70/30 |
| DF6 | 3 | 10 | 95/5 |
| DF7 | 3 | 7.5 | 85/15 |

TABLE 18

| | DF1 at 300° F. (initial/aged) | DF2 at 350° F. (initial/aged) | DF3 at 300° F. (initial/aged) | DF4 at 350° F. (initial/aged) |
|---|---|---|---|---|
| Plastic viscosity (cP) | 74/28 | 96/68 | nm/42 | nm/81 |
| Yield Point (*) | 57/8 | 55/27 | nm/9 | nm/17 |
| L6 (*) | 13/3 | 15/8 | 39/4 | 52/7 |
| L3 (*) | 5/3 | 12/6 | 27/3 | 52/5 |

TABLE 18-continued

| | DF1 at 300° F. (initial/aged) | DF2 at 350° F. (initial/aged) | DF3 at 300° F. (initial/aged) | DF4 at 350° F. (initial/aged) |
|---|---|---|---|---|
| Gel strength | | | | |
| (10") (*) | 12/3 | 12/7 | 12/3 | 12/7 |
| (10') (*) | 22/8 | 17/15 | 22/8 | 17/15 |
| HTHP fluid loss (ml/30 min) | —/3.6 | —/6.8 | —/5.6 | —/12 | nm: not measurable
(*) lbs/100 ft²

TABLE 19

| | DF5 at 350° F. (initial/aged) | DF6 at 350° F. (initial/aged) | DF7 at 350° F. (initial/aged) |
|---|---|---|---|
| Plastic viscosity (cP) | nm/67 | 87/31 | 90/45 |
| Yield Point (*) | nm/43 | 57/0 | 42/7 |
| L6 (*) | 47/17 | 9/1 | 12/3 |
| L3 (*) | 40/14 | 6/0 | 9/2 |
| Gel strength | | | |
| (10") (*) | 40/15 | 8/12 | 10/16 |
| (10') (*) | 52/19 | 1/1 | 3/5 |
| HTHP fluid loss (ml/30 min) | —/2.4 | —/12.4 | —/4.4 | nm: not measurable
(*) lbs/100 ft²

As shown the water-in-oil emulsion drilling fluid of the present invention is stable at HTHP conditions.

Thus provided is a thermally stable drilling fluid which has excellent fluid loss control and which includes a reduced fraction of solids as compared to conventional fluids, thereby reducing the likelihood of formation damage and also reducing the cost of the fluid.

This invention may be embodied in other forms or carried out in other ways without departing from the essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A thermally stable drilling fluid system comprising drilling fluid and an additive comprising styrene-butadiene copolymers having an average molecular weight greater than about 500,000 g/mol, wherein said drilling fluid system exhibits fluid loss control at high temperature, greater than 350° F., and high pressure conditions, up to 500 psi.

2. A drilling fluid system according to claim 1, wherein said additive has a styrene content of about 23% wt.

3. A drilling fluid system according to claim 1, wherein said additive is present in an amount between about 1 ppb to about 6 ppb.

4. A drilling fluid system according to claim 1, wherein said drilling fluid comprises oil and an organophilic clay.

5. A drilling fluid system according to claim 4, wherein said oil is gasoil.

6. A drilling fluid system according to claim 4, wherein said clay is selected from the group consisting of hectorite, bentonite and mixtures thereof.

7. A drilling fluid system according to claim 4, wherein said clay is bentonite.

8. A drilling fluid system according to claim 4, wherein said clay is present in an amount between about 1 ppb to about 8 ppb.

9. A drilling fluid system according to claim 4, wherein said drilling fluid further comprises at least one additional additive selected from the group consisting of emulsifiers, wetting agents and mixtures thereof.

10. A drilling fluid system according to claim 9, wherein said additive is an emulsifier selected from the group consisting of ionic surfactants, and mixtures of non-ionic surfactants and ionic surfactants.

11. A drilling fluid system according to claim 4, wherein said drilling fluid further comprises a weighting agent for providing said system with a desired density.

12. A drilling fluid system according to claim 11, wherein said weighting agent is selected from the group consisting of calcium carbonate, barite, hematite and mixtures thereof.

13. A drilling fluid system according to claim 4, wherein said system consists essentially of said oil, said organophilic clay and said styrene-butadiene copolymer.

14. A drilling fluid system according to claim 1, wherein said drilling fluid comprises a water-in-oil emulsion and a surfactant.

15. A drilling fluid system according to claim 14, wherein said water and said oil are present at a ratio by volume of said water to said oil of between about 40:60 to about 5:95.

16. A drilling fluid system according to claim 14, wherein said surfactant is an anionic surfactant.

17. A drilling fluid system according to claim 14, wherein said surfactant is an alkyl aryl sulfonate.

18. A drilling fluid system according to claim 14, wherein said surfactant is calcium phenylsulfonate.

19. A drilling fluid system according to claim 14, wherein said surfactant is present in an amount of between about 5 ppb to about 10 ppb.

20. A drilling fluid system according to claim 14, wherein said system consists essentially of said water-in-oil emulsion, said surfactant and said styrene-butadiene copolymer.

* * * * *